(12) United States Patent
Patel et al.

(10) Patent No.: US 9,571,222 B2
(45) Date of Patent: Feb. 14, 2017

(54) PROVISIONING TIME-VARYING TRAFFIC IN SOFTWARE-DEFINED FLEXIBLE GRID TRANSPORT NETWORKS

(71) Applicant: NEC Laboratories America, Inc., Princeton, NJ (US)

(72) Inventors: Ankitkumar N. Patel, E. Brunswick, NJ (US); Philip N. Ji, Princeton, NJ (US)

(73) Assignee: NEC CORPORATION (JP)

( * ) Notice: Subject to any disclaimer, the term of this patent is extended or adjusted under 35 U.S.C. 154(b) by 314 days.

(21) Appl. No.: 14/447,064

(22) Filed: Jul. 30, 2014

(65) Prior Publication Data

US 2015/0043915 A1 Feb. 12, 2015

Related U.S. Application Data

(60) Provisional application No. 61/863,187, filed on Aug. 7, 2013.

(51) Int. Cl.
*H04J 3/16* (2006.01)
*H04J 14/02* (2006.01)
(Continued)

(52) U.S. Cl.
CPC .......... *H04J 14/0227* (2013.01); *H04B 10/27* (2013.01); *H04L 45/302* (2013.01); *H04L 45/125* (2013.01); *H04L 45/62* (2013.01)

(58) Field of Classification Search
CPC .................................................. H04J 14/0027
(Continued)

(56) References Cited

U.S. PATENT DOCUMENTS 6,999,471 B1 * 2/2006 Frazer .................. H04J 3/1682
370/229
2012/0014332 A1 * 1/2012 Smith .................. H04W 16/14
370/329

(Continued)

OTHER PUBLICATIONS

Christodoulopoulos, K., et al. "Time-Varying Spectrum Allocation Policies and Blocking Analysis in Flexible Optical Networks" IEEE Journal on Selected Areas in Communications, vol. 31, No. 1. Jan. 2013. pp. 13-25.

(Continued)

*Primary Examiner* — Shripal Khajuria
(74) *Attorney, Agent, or Firm* — Joseph Kolodka

(57) ABSTRACT

A method is provided for provisioning time-varying traffic demands in an optical transport software-defined network. The method includes pre-provisioning an amount of bandwidth for best effort traffic. The method further includes iteratively applying, using a processor, an iterative simulated annealing-based traffic provisioning procedure to determine candidate bandwidths for the best effort traffic in a set of iterations. The method also includes selecting a particular candidate bandwidth that has a corresponding blocking value lower than a given blocking requirement β and that requires a minimum amount of spectrum as compared to other candidate bandwidths. The iteratively applying step includes varying the amount of bandwidth for best effort traffic in each iteration to determine the candidate bandwidths. The iteratively applying step further includes varying an amount of shared bandwidth between neighboring channels, out of the amount of bandwidth for best effort traffic, in each iteration, to further determine the candidate bandwidths.

20 Claims, 5 Drawing Sheets

(51) Int. Cl.
H04B 10/27 (2013.01)
H04L 12/725 (2013.01)
H04L 12/729 (2013.01)
H04L 12/721 (2013.01)

(58) Field of Classification Search
USPC .......................................................... 370/468
See application file for complete search history.

(56) References Cited

U.S. PATENT DOCUMENTS

2013/0179588 A1* 7/2013 McCarthy ........ H04N 21/23418
709/231
2013/0258848 A1* 10/2013 Osterling .......... H04W 28/0231
370/235

OTHER PUBLICATIONS

Christodoulopoulos, K., et al. "Dynamic Bandwidth Allocation in Flexible OFDM-based Networks" Optical Fiber Communication Conference and Exposition (OFC/NFOEC), and the National Fiber Optic Engineers Conference. Mar. 2011. (3 Pages).

Huang, Y., et al. "Terabit/s Optical Superchannel with Flexible Modulation Format for Dynamic Distance/Route Transmission" Optical Fiber Communication Conference and Exposition (OFC/NFOEC), and the National Fiber Optic Engineers Conference. Mar. 2012. (3 Pages).

Ji, P. "Software Defined Optical Network" 11th International Conference on Optical Communications and Networks (ICOCN). Nov. 2012. (4 Pages).

Jinno, M., et al. "Spectrum-Efficient and Scalable Elastic Optical Path Network: Architecture, Benefits, and Enabling Technologies" IEEE Communications Magazine, Nov. 2009. pp. 66-73.

Klinkowski, M., et al. "Elastic Spectrum Allocation for Time-Varying Traffic in FlexGrid Optical Networks" IEEE Journal on Selected Areas in Communications, vol. 31, No. 1. Jan. 2013. pp. 26-38.

McKeown, N., et al. "OpenFlow: Enabling Innovation in Campus Networks" ACM SIGCOMM Computer Communication Review. vol. 38. No. 2. Mar. 2008. (6 Pages).

Patel, A., et al. "QoS-Aware Optical Burst Switching in OpenFlow Based Software-Defined Optical Networks" 17th International Conference on Optical Networking Design and Modeling. Apr. 2013. pp. 275-280.

Patel, A., et al. "Routing,Wavelength Assignment, and Spectrum Allocation in Transparent Flexible Optical WDM (FWDM) Networks" Photonics in Switching. Jul. 2010. (3 Pages).

Sambo, N., et al. "Routing and Spectrum Assignment for Superchannels in Flex-grid Optical Networks" European Conference and Exhibition on Optical Communication. Sep. 2012. (3 Pages).

Shen, G., et al. "Maximizing Time-Dependent Spectrum Sharing between Neighbouring Channels in CO-OFDM Optical Networks" 2011 13th International Conference onTransparent Optical Networks (ICTON). Jun. 2011. (4 Pages).

International Telecommunication Union, "Spectral grids for WDM applications: DWDM frequency grid" Jun. 2002. (14 Pages).

Xia, T., "High Capacity Field Trials of 40.5 Tb/s for LH Distance of 1,822 km and 54.2 Tb/s for Regional Distance of 634 km" Optical Fiber Communication Conference and Exposition and the National Fiber Optic Engineers Conference (OFC/NFOEC). Mar. 2013. (3 Pages).

Xie, C., et al. "Spectrum Sharing for Time-varying Traffic in OpenFlowbased Flexi-Grid Optical Networks" Communications and Photonics Conference (ACP). Nov. 2012. (3 Pages).

Zhang, J., "Time-dependent spectrum resource sharing in flexible bandwidth optical networks." IET Networks. vol. 1, No. 4. Sep. 2012. (10 Pages).

* cited by examiner

PROVISIONING TIME-VARYING TRAFFIC IN SOFTWARE-DEFINED FLEXIBLE GRID TRANSPORT NETWORKS

RELATED APPLICATION INFORMATION

This application claims priority to provisional application Ser. No. 61/863,187 filed on Aug. 7, 2013, incorporated herein by reference.

BACKGROUND

Technical Field

The present invention relates to signal processing, and more particularly to provisioning time-varying traffic in software-defined flexible grid transport networks.

Description of the Related Art

While designing a flexible grid network for a time-varying traffic demands, an open challenge is how to provision these demands using adaptive optical channels, such that the maximum required spectrum to support the given demands is minimized for the given blocking probability of incremental traffic. The problem is referred to as the time-varying traffic provisioning problem.

SUMMARY

These and other drawbacks and disadvantages of the prior art are addressed by the present principles, which are directed to provisioning time-varying traffic in software-defined flexible grid transport networks.

According to an aspect of the present principles, a method is provided for provisioning time-varying traffic demands in an optical transport software-defined network. The method includes pre-provisioning an amount of bandwidth for best effort traffic. The method further includes iteratively applying, using a processor, an iterative simulated annealing-based traffic provisioning procedure to determine candidate bandwidths for the best effort traffic in a set of iterations. The method also includes selecting a particular one of the candidate bandwidths for the best effort traffic that has a corresponding blocking value lower than a given blocking requirement $\beta$ and that requires a minimum amount of spectrum as compared to other ones of the candidate bandwidths for the best effort traffic. The iteratively applying step includes varying the amount of bandwidth for best effort traffic in each of the iterations to determine the candidate bandwidths for the best effort traffic. The iteratively applying step further includes varying an amount of shared bandwidth between neighboring channels, out of the amount of bandwidth for best effort traffic, in each of the iterations, to further determine the candidate bandwidths for the best effort traffic.

According to another aspect of the present principles, there is provided a computer program product comprising a computer readable storage medium having computer readable program code embodied therein for performing a method for provisioning time-varying traffic demands in an optical transport software-defined network. The method includes pre-provisioning an amount of bandwidth for best effort traffic. The method further includes iteratively applying, using a processor, an iterative simulated annealing-based traffic provisioning procedure to determine candidate bandwidths for the best effort traffic in a set of iterations. The method also includes selecting a particular one of the candidate bandwidths for the best effort traffic that has a corresponding blocking value lower than a given blocking requirement $\beta$ and that requires a minimum amount of spectrum as compared to other ones of the candidate bandwidths for the best effort traffic. The iteratively applying step includes varying the amount of bandwidth for best effort traffic in each of the iterations to determine the candidate bandwidths for the best effort traffic. The iteratively applying step further includes varying an amount of shared bandwidth between neighboring channels, out of the amount of bandwidth for best effort traffic, in each of the iterations, to further determine the candidate bandwidths for the best effort traffic.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

The present principles are directed to provisioning time-varying traffic in software-defined flexible grid transport networks. It is to be appreciated that the terms "traffic demand" and "request" are used interchangeably herein. Similarly, the terms "reserve" and "provision" are used also interchangeably.

In an embodiment, we provide an Iterative Simulated Annealing-based (ISA) procedure that provisions time-varying traffic demands in the minimum amount of spectrum by sharing the maximum amount of spectrum among neighboring channels for a given blocking probability. In the first phase, the spectrum is provisioned for x Gb/s of guaranteed traffic and y Gb/s of projected best effort bandwidth for the given traffic demands using the ISA procedure. As used herein, the terns "best effort bandwidth" refers to the bandwidth provisioned for best effort traffic. As used herein, the terms "best effort traffic" refers to traffic with a lower priority that may be dropped if sufficient bandwidth resources are not available. Best effort traffic has loose service level agreement (SLA) requirements. Best effort traffic is also referred to as default traffic. As used herein, the terms "guaranteed traffic" refers to traffic with a high priority that must be provisioned in a network and is bounded to strict SLA requirements. During a lack of bandwidth resources, guaranteed traffic must be provisioned with a higher priority. Guaranteed traffic is also referred to as priority traffic. The ISA procedure routes and assigns spectrum such that the p G/bs of pre-provisioned spectrum for the projected best effort traffic can be shared between neighboring channels. In the next phase, expansion and contraction of the time-varying best effort traffic are dynamically executed for a sufficient time until the network reaches a steady-state to determine blocking of the best effort traffic. The procedure increases the amount of provisioned bandwidth and shared bandwidth for the best effort traffic, and repeats the procedure until the potential pre-provisioned and shared bandwidths for the best effort traffic are considered. Finally, among the found solutions for the potential bandwidths of the best effort traffic, the procedure selects a solution that meets the blocking requirement of the network with the minimum amount of spectrum.

A brief description will now be given of some of the many attendant advantages of the ISA procedure. Advantageously, the ISA procedure provides an effective tool for planning and designing networks that supports time-varying traffic demands. Moreover, the ISA procedure effectively provisions the given time-varying traffic demands within the minimum amount of spectrum for the given blocking probability of the best effort traffic. Further, the ISA procedure is the first procedure that addresses the time-varying traffic provisioning problem with the goal of minimizing spectrum for the given blocking probability of traffic.

Figure 1:
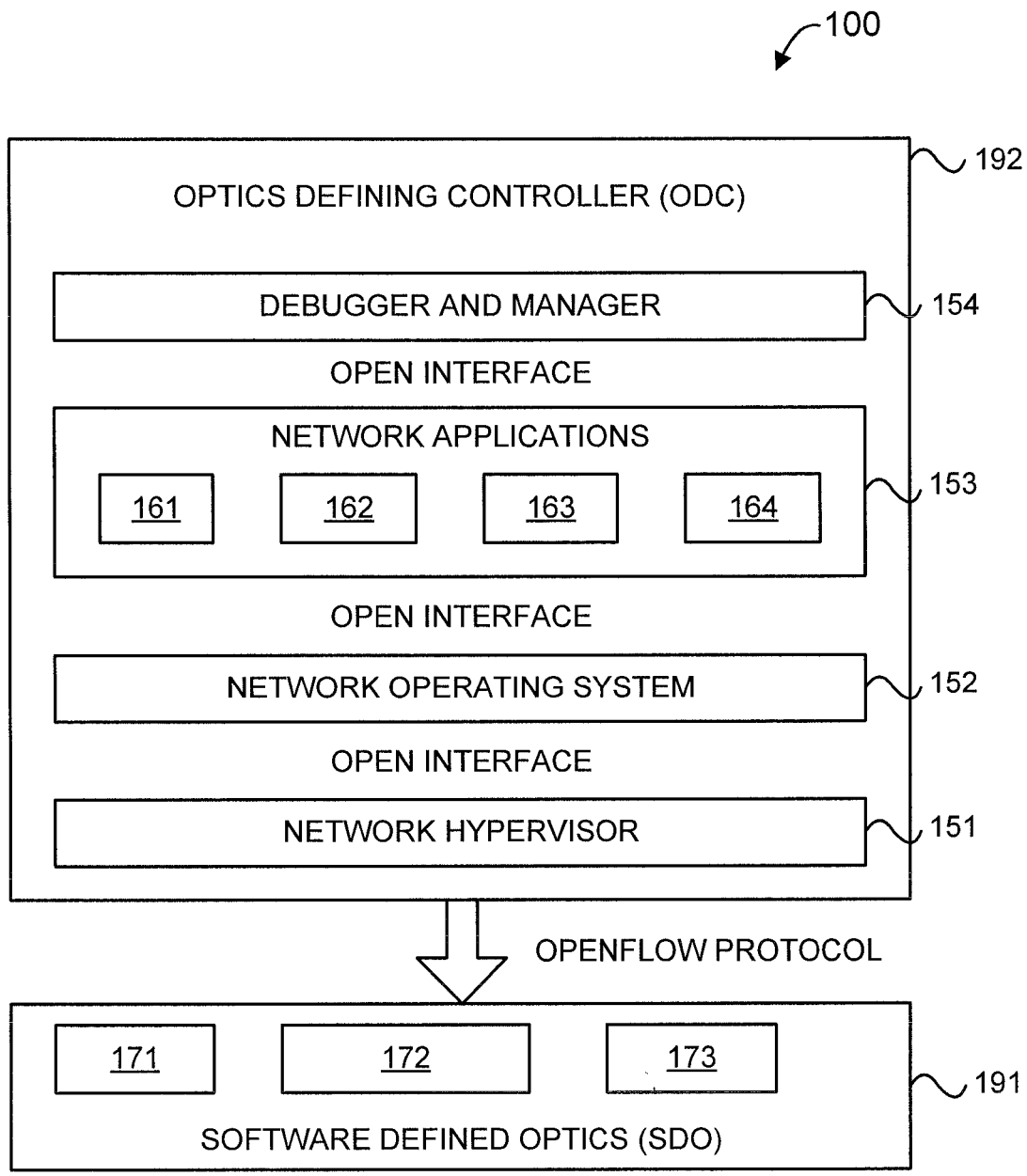
FIG. 1 shows an exemplary optical transport software defined network (SDN) architecture 100 to which the present principles can be applied, in accordance with an embodiment of the present principles.

FIG. 1 shows an exemplary optical transport software defined network (SDN) architecture 100 to which the present principles can be applied, in accordance with an embodiment of the present principles. In the optical transport SDN architecture 100, the control plane is abstracted from the physical hardware of the network elements and most network control and management intelligence now resides in a centralized controller, namely an optics defining controller (ODC) 192. The ODC 192 controls network elements using a standardized protocol, such as OpenFlow protocol over standardized interfaces at controller and network elements. The control plane decisions present themselves in the form of rules, actions, and policies, and network elements apply these decisions based on match-action on connections. Thus, optical transport SDN 100 partitions a network into software defined optics (SDO) 191 and the optics defined controller (ODC) 192.

The ODC 192 manages the network, and performs network optimization and customization to utilize flexibility of the SDO 191. The ODC functionalities are further extracted into a network hypervisor 151, a network operating system 152, network applications and database collectively represented by the figure reference numeral 153, and debugger and management planes 154. These planes 154 are isolated by open standardized interfaces to allow simultaneous and rapid innovations at each layer independently. Various control plane functionalities including, for example, but not limited to, routing 161, scheduling 162, access control 163, Quality of Service (QoS) management 164, cloud resource mapping, resource allocation, protection and restoration, defragmentation, energy optimization, and so forth (the latter not shown), are installed as applications and data base in the ODC 192. Network hypervisor 151 offers virtualization by providing isolation and sharing functions to a data plane as well as an abstract view of network and computing resources while hiding physical layer implementation details to a controller in order to optimize and simplify the network operations. Network operating system 152 offers a programmable platform for the execution of applications and hypervisors. Debugger and management planes 154 offer access control 163 and QoS management 164 as network applications, while monitoring network performance, and performing fault isolation, localization, and recovery.

The software defined optics (SDO) 191 include a programmable transponder 171, colorless-directionless-contentionless-gridless (CDCG) ROADMs 172, and an amplifier 173.

In accordance with one or more embodiments of the present principles, we provide an Iterative Simulated Annealing (ISA) procedure in which bandwidth for best effort traffic, denoted as y Gb/s, is pre-provisioned along with the bandwidth for guaranteed traffic in advance, and among this pre-provision bandwidth, y Gb/s, the procedure allows to share up to p Gb/s of bandwidth between neighboring channels. Thus, dynamic best effort traffic can vary from 0 up to y Gb/s on-the-fly. Since this y Gb/s bandwidth may not always be occupied by the best effort traffic, the spectrum provisioned for y Gb/s bandwidth can be shared among neighboring channels. The procedure allows (p/y) fraction of this spectrum to be shared among neighboring channels. In the subsequent phase, the procedure provisions the given set of traffic demands using the Simulated Annealing-based traffic provisioning procedure with the goal of maximizing sharing of spectrum between neighboring channels. Once the traffic is provisioned, the procedure dynamically expands and contracts the channels upon arrivals and departures of best effort traffic demands based on the given distributions. Upon arrivals of dynamic best effort traffic, the procedure starts occupying either provisioned or shared channel spectrum towards the lower frequencies first starting from the center channel frequency. If the spectrum at lower frequencies is already occupied, then the procedure starts occupying either provisioned or shared channel spectrum towards the higher frequency starting from the center channel frequency. If the spectrum of a channel at both lower and higher frequencies is already occupied, then the traffic is blocked. The procedure evaluates the network performance in such dynamic traffic scenario until the network reach in the steady state, and finally determines the blocking of best effort traffic. The ISA procedure iteratively repeats the same procedure after increasing the shared bandwidth p of best effort traffic by v Gb/s, where v Gb/s is the granularity at which transponder can expand and contract the channel bandwidth. Each iteration results in one potential solution.

If the shared bandwidth p exceeds the pre-provisioned bandwidth y, then the ISA procedure increases the amount of pre-provisioned bandwidth y by v Gb/s. The procedure is repeated until pre-provisioned bandwidth becomes equivalent to the transponder capacity L Gb/s. Finally, among the found potential solutions, the procedure selects a solution that results in a blocking lower than the given blocking limit β, and requires the minimum amount of spectrum.

The ISA procedure is a probabilistic iterative method designed based on the physical process of annealing a solid. Here, we modified this process to provision time-varying traffic in networks as follows. The configuration of the procedure is defined as an order of demands in which the time-varying connections are routed, wavelengths are assigned, and spectrum is allocated. An energy function to be minimized represents the maximum required spectrum over a fiber link. A temperature is defined as a global time-varying parameter T, and the annealing schedule controls how this temperature varies over time.

Initially, the ISA procedure determines the cost of each demand, which is defined as the product of the requested guaranteed bandwidth and the number of hops along the shortest route between source and destination nodes, $h_{s,d}$. In the next step, the procedure sorts the given traffic demands in descending order of their cost, and this sorted order of demands is considered a new configuration N. A random order of demands is considered as a current configuration C. The energy function of the current configuration, E(C), and the new configuration, E(N), are initialized to infinite. The procedure also initializes temperature T and an annealing parameter α. After initialization, the process applies the routing, wavelength assignment, and spectrum allocation procedure for time-varying traffic demands in the order of traffic demands defined in the new configuration N The maximum required spectrum over the fiber represents the energy of the configuration N,E(N). If the energy of the new configuration E(N) is reduced compared to the energy of the current configuration E(C), then the procedure replaces the current C configuration by the new configuration N. On the other hand, if the energy is not improved, then the procedure replaces the current configuration with the new configuration with probability $e^{-(E(N)-E(C)/T)}$. In the next step, the procedure updates the temperature T by the annealing schedule that is a*T. Finally, the procedure checks the termination conditions, that is whether the temperature is reduced beyond the threshold or the maximum number of iterations has been reached. If either one of these conditions is met, then the procedure is terminated. Otherwise, the procedure generates a new configuration N from the current configuration C by swapping the order of two neighboring demands that are randomly selected, and repeats the same procedure.

The procedure considers discretized spectrum for the routing, wavelength assignment, and spectrum allocation (RWSA) procedure. Each slot in the spectrum is referred to as a wavelength slot. Each wavelength slot is of g GHz. The spectrum is defined in terms of the number of consecutive wavelength slots. The center wavelength slot is referred to as the wavelength of a channel. The state of a wavelength slot can be occupied, available, shared, or provisioned. An occupied state represents that the wavelength slot is currently used to carry traffic. An available state represents that the wavelength slot is not assigned to any channel. A shared state represents that the wavelength slot is pre-provisioned and is shared by multiple channels. A provisioned state represents that the wavelength slot is reserved for a channel, but is not used to carry any traffic. The state of wavelength slots along a fiber/route is referred to as the spectrum profile of the fiber/route. A set of consecutive wavelength slots with states either available or shared is referred to as a spectral island. A set of wavelength slots reserved for guaranteed traffic is referred to as guaranteed spectrum. A set of wavelength slots reserved for best effort traffic and which is not shared is referred to as provisioned spectrum. A set of wavelength slots shared among neighboring channels is referred to as the shared spectrum. How the provisioned spectrum is reserved around the guaranteed spectrum and how the shared spectrum reserved around the provisioned spectrum is described herein. The Ceil(.) described with respect thereto denotes a ceiling operation in mathematics.

For routing, wavelength assignment, and spectrum allocation of time-varying traffic demands, the procedure pre-calculates the K-shortestroutes between each pair of nodes. For a traffic demand, the procedure first selects one of the K-shortestroutes, which is not yet considered. The procedure finds the spectrum profile along the selected routes as follows. If wavelength slot w is occupied on at least one of the links along the route, then the state of the wavelength slot w of the spectrum profile is occupied. If the wavelength slot w is not occupied on all the links along the route, and the state of wavelength slot w is provisioned on at least one of the links along the route, then the state of wavelength slot w of the spectrum profile is provisioned. If wavelength slot w is neither occupied nor provisioned on all the links along the route, and the state of wavelength slot w is shared on at least one of the links along the route, then the state of wavelength slot w of the spectrum profile is shared. If the wavelength slot w is available on all the links along the route, then the state of wavelength slot w of the spectrum profile is available. After finding the spectrum profile of the selected route, the procedure finds a spectral island with the following requirements. A spectral island with at least [Ceil(x/v)*Ceil(z/g)] number consecutive wavelength slots with state available (called guaranteed spectrum), and [Ceil((y−p)/v)*Ceil(z/g)] number of wavelength slots with state available around the guaranteed spectrum (called provisioned spectrum), and [Ceil(p/v)*Ceil(z/g)] number of wavelength slots around provisioned spectrum with state either available or shared (called shared spectrum) at the edges of the spectral island are searched in the spectrum profile of the route. The procedure records the wavelength at which the spectrum island is available. The above mentioned procedure is repeated for all K-shortestroutes. Finally the procedure selects a route on which the spectrum island is available at the lowest wavelength, and updates the relevant states of wavelength slots on all links along the route as follows. On the selected route and in the spectrum island at the selected wavelength, the procedure reserves [Ceil(x/v)*Ceil(z/g)] number consecutive available wavelength slots for guaranteed traffic by updating the state of the wavelength slots to be occupied, [Ceil((y−p)/v)*Ceil(z/g)] number of available wavelength slots for best effort traffic around the guaranteed spectrum by updating the state of the wavelength slots to be provisioned, and [Ceil(p/v)*Ceil(z/g)] number of shared or available wavelength slots around the provisioned spectrum for best effort traffic by updating the state of the wavelength slots to be shared.

Figure 2:
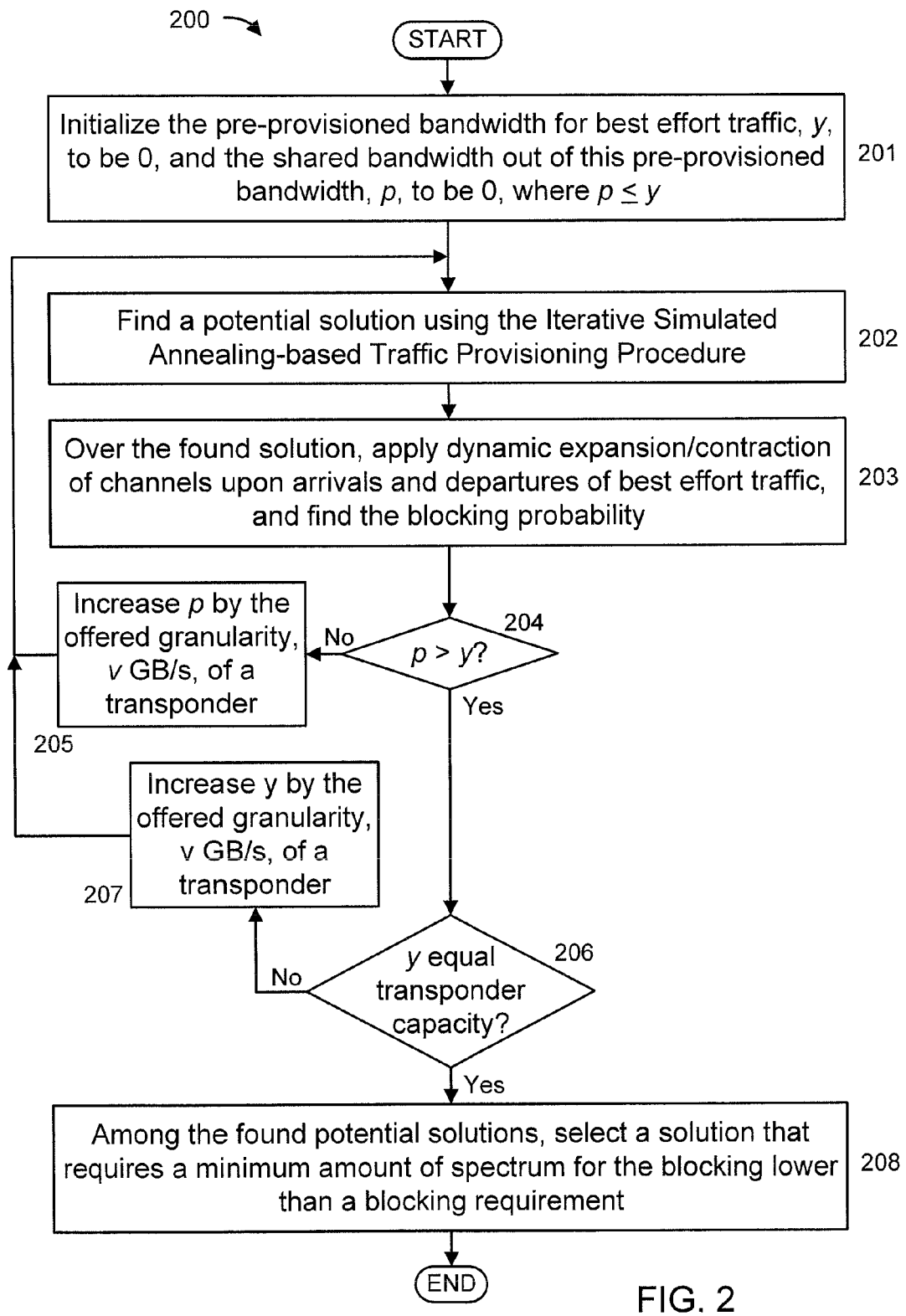
FIG. 2 shows an exemplary Iterative Simulated Annealing-based method 200, in accordance with an embodiment of the present principle.

FIG. 2 shows an exemplary Iterative Simulated Annealing-based method 200, in accordance with an embodiment of the present principles.

At step 201, initialize the pre-provisioned bandwidth for best effort traffic, y, to be 0, and the shared bandwidth out of this pre-provisioned bandwidth, p, to be 0, where p≤y.

At step 202, find a potential solution using the Simulated Annealing-based Traffic Provisioning procedure.

At step 203, over the found solution, apply dynamic expansion/contraction of channels upon arrivals and departures of best effort traffic, and find the blocking probability. Upon arrivals of dynamic best effort traffic, the procedure starts occupying either provisioned or shared channel spectrum towards the lower indexed wavelength slots first starting from the center channel frequency. If the lower indexed wavelength slots of a channel are already occupied, then the procedure starts occupying either provisioned or shared channel spectrum towards the higher indexed wavelength slots starting from the center channel frequency.

At step 204, check whether the shared bandwidth exceeds the pre-provision bandwidth for best effort traffic. If not, then the method proceeds to step 205. Otherwise, the method proceeds to step 206.

At step 205, increase p by the offered granularity, v Gb/s, of a transponder.

At step 206, check whether y Gb/s is equal to the capacity of transponder L GB/s. If not, then the method proceeds to step 207. Otherwise, the method proceeds to step 208.

At step 207, increase y by the offered granularity, v Gb/s, of a transponder.

At step 208, among the found potential solutions, select a solution that requires minimum amount of spectrum for the blocking lower than β.

Figure 3:
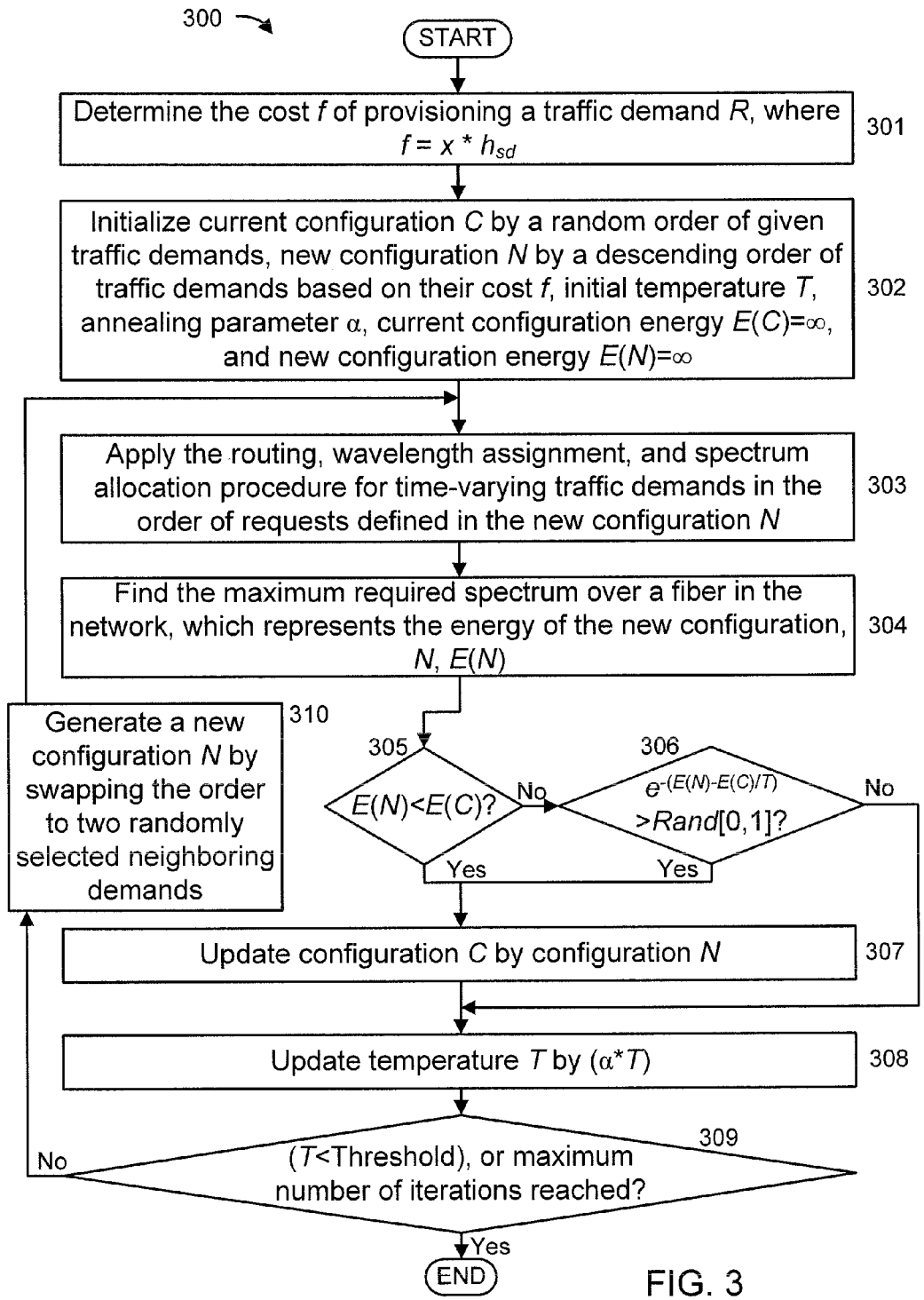
FIG. 3 shows an exemplary Iterative Simulated Annealing-based traffic provisioning method 300, in accordance with an embodiment of the present principles.

FIG. 3 shows an exemplary Iterative Simulated Annealing-based traffic provisioning method 300, in accordance with an embodiment of the present principles.

At step 301, determine the cost f of provisioning a traffic demand R, where $f=x*h_{sd}$.

At step 302, initialize a current configuration C by a random order of given traffic demands, new configuration N by a descending order of traffic demands based on their cost f, initial temperature T, annealing parameter α, current configuration energy $E(C)=\infty$, and new configuration energy $E(N)=\infty$.

At step 303, apply the routing, wavelength assignment, and spectrum allocation (RWSA) procedure for time-varying traffic demands in the order of requests defined in the new configuration N.

At step 304, find the maximum required spectrum over a fiber in the network, which represents the energy of new configuration N, E(N).

At step 305, check whether the energy of the new configuration is smaller than the energy of the current configuration. If the energy of the new configuration is smaller, than the method proceeds to step 307. Otherwise, the method proceeds to step 306.

At step 306, check whether the probability $e^{-(E(N)-E(C)/T)}$ is greater than a uniform random number between 0 and 1. If not, then the method proceeds to step 308. Otherwise, the method proceeds to step 307.

At step 307, update configuration C by configuration N.

At step 308, update temperature T by (a*T).

At step 309, check whether the temperature T is smaller than the given threshold or the maximum number of iterations is reached. If any one of these conditions is met, then the method is terminated. Otherwise, the method proceeds to step 310.

At step 310, generate a new configuration N by swapping the order of two neighboring demands that are randomly selected.

Figure 4:
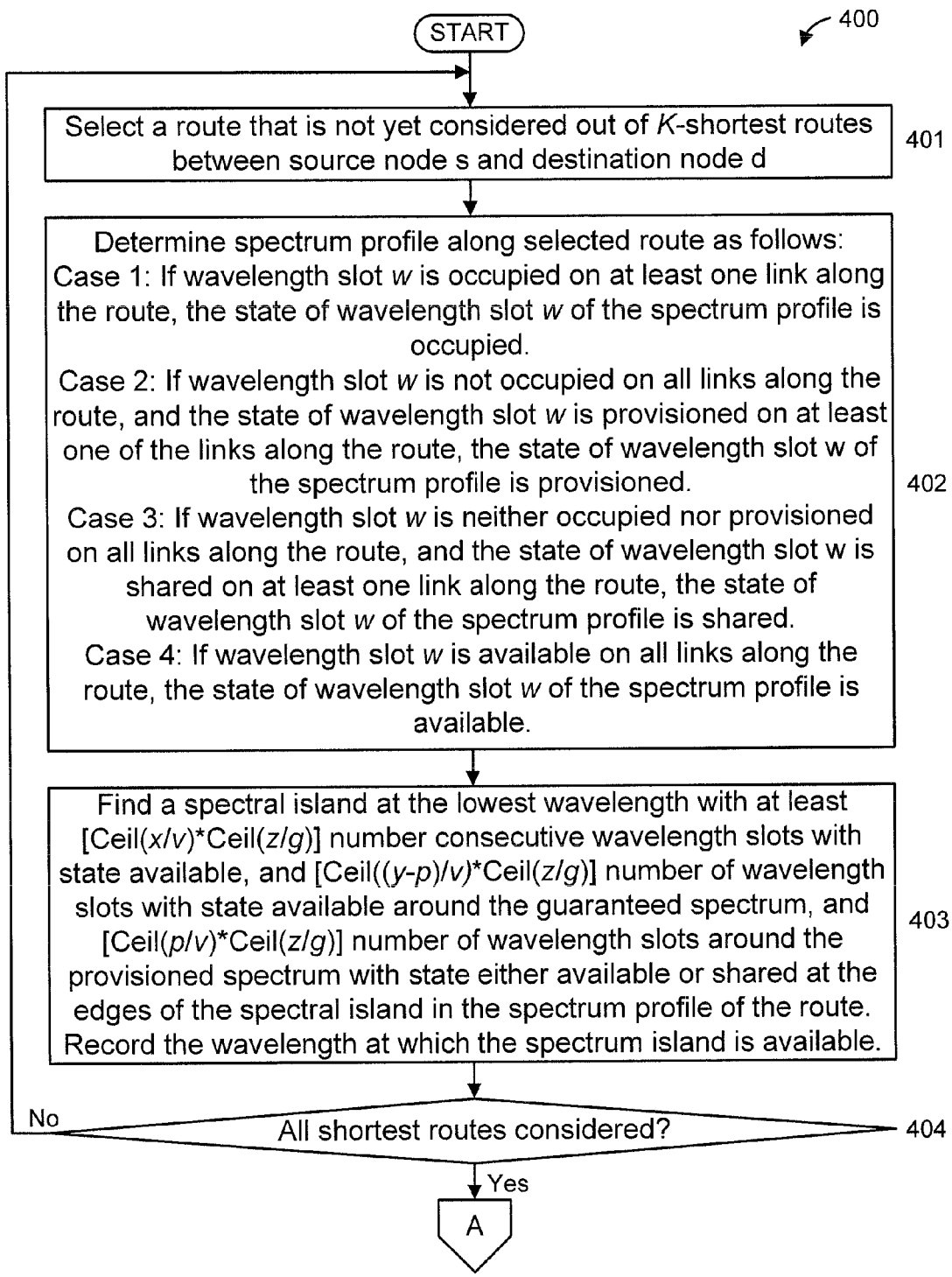
FIGS. 4-5 show an exemplary routing, wavelength assignment, and spectrum allocation (RWSA) method 400, in accordance with an embodiment of the present principles.
Figure 5:
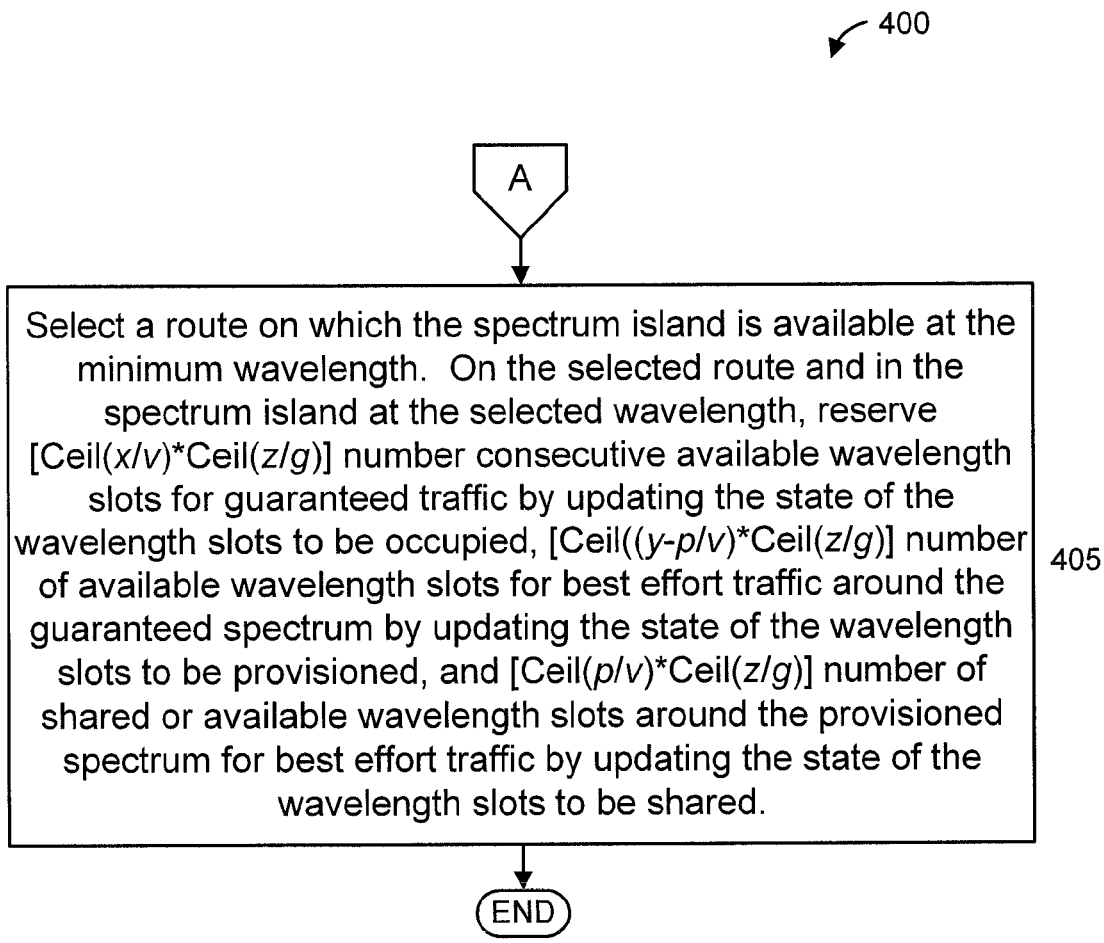

FIGS. 4-5 show an exemplary routing, wavelength assignment, and spectrum allocation (RWSA) method 400, in accordance with an embodiment of the present principles.

At step 401, select a route that is not yet considered out of the K-shortest routes between source node s and destination node d.

At step 402, determine the spectrum profile along the selected route as follows.

Case 1: If wavelength slot w is occupied on at least one of the link along the route, the state of wavelength slot w of the spectrum profile is occupied.

Case 2: If wavelength slot w is not occupied on all the links along the route, and the state of wavelength slot w is provisioned on at least one of the links along the route, the state of wavelength slot w of the spectrum profile is provisioned.

Case 3: If wavelength slot w is neither occupied nor provisioned on all the links along the route, and the state of wavelength slot w is shared on at least one of the links along the route, the state of wavelength slot w of the spectrum profile is shared.

Case 4: If wavelength slot w is available on all the links along the route, the state of wavelength slot w of the spectrum profile is available.

At step 403, find a spectral island at the lowest wavelength with at least [Ceil(x/v)*Ceil(z/g)] number consecutive wavelength slots with state available (called guaranteed spectrum), and [Ceil((y−p)/v)*Ceil(z/g)] number of wavelength slots with state available around the guaranteed spectrum (called provisioned spectrum), and [Ceil(p/v)*Ceil(z/g)] number of wavelength slots around the provisioned spectrum with state either available or shared (called shared spectrum) at the edges of the spectral island in the spectrum profile of the route. The method records the wavelength at which the spectrum island is available.

At step 404, check whether all routes are considered. If all K-shortest routes are taken into consideration, then the method proceeds to step 405. Otherwise, the method returns to step 401.

At step 405, select a route on which the spectrum island is available at the minimum wavelength. On the selected route and in the spectrum island at the selected wavelength, the procedure reserves [Ceil(x/v)*Ceil(z/g)] number consecutive available wavelength slots for guaranteed traffic by updating the state of the wavelength slots to be occupied, [Ceil((y−p)/v)*Ceil(z/g)] number of available wavelength slots for best effort traffic around the guaranteed spectrum by updating the state of the wavelength slots to be provisioned, and [Ceil(p/v)*Ceil(z/g)] number of shared or available wavelength slots around the provisioned spectrum for best effort traffic by updating the state of the wavelength slots to be shared.

Embodiments described herein may be entirely hardware, entirely software or including both hardware and software elements. In a preferred embodiment, the present invention is implemented in software, which includes but is not limited to firmware, resident software, microcode, etc.

Embodiments may include a computer program product accessible from a computer-usable or computer-readable medium providing program code for use by or in connection with a computer or any instruction execution system. A computer-usable or computer readable medium may include any apparatus that stores, communicates, propagates, or transports the program for use by or in connection with the instruction execution system, apparatus, or device. The medium can be magnetic, optical, electronic, electromagnetic, infrared, or semiconductor system (or apparatus or device) or a propagation medium. The medium may include a computer-readable medium such as a semiconductor or solid state memory, magnetic tape, a removable computer diskette, a random access memory (RAM), a read-only memory (ROM), a rigid magnetic disk and an optical disk, etc.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended, as readily apparent by one of ordinary skill in this and related arts, for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. Additional information is provided in an appendix to the application entitled, "Additional Information". It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

There's no prior art on this topic. Below are some related references for the background.

[NMcKeown] N. McKeown, T. Anderson, H. Balakrishnan et. al, "OpenFlow: Enabling Innovation in Campus Networks," *Proc. of ACM SIGCOMM*, vol. 38, issue. 2, pp. 69-74, April 2008

[APatel] A. N. Patel, P. N. Ji, and T. Wang, "QoS-Aware Optical Burst Switching in OpenFlow-based Software-Defined Optical Networks," *Proc. of ONDM*, pp. 274-279, April 2013

[P. Ji] P. Ji, "Software Defined Optical Networks, " *Proc. of ICOCN*, pp. 31-34, November 2012

[ITU-T] ITU-T G.694.1, "Spectral grids for WDM applications: DWDM frequency grid," May 2002

[APatel2] A. N. Patel et. al, "Routing, Wavelength Assignment, and Spectrum Allocation in Transparent Flexible Optical (FWDM) Networks," *Proc. of Photonics in Switching*, no. PDPWG1, 2010

[MJinno] M. Jinno et. al., "Spectrum-Efficient and Scalable Elastic Optical Path Network: Architecture, Benefits, and Enabling Technologies," *IEEE Communications Magazine*, vol. 47, no. 11, pp. 66-73, November 2009

[YKai] Y. Huang et. al, "Terabit/s Optical Superchannel with Flexible Modulation Format for Dynamic Distance/Route Transmission," *Proc. of OFCNFOEC*, no. OM3H.4, 2012

[TXia] T. Xia et. al, "High Capacity Field Trials of 40.5 Tb/s for LH Distance of 1,822 km and 54.2 Tb/s for Regional Distance of 634 km," *Proc, of OFCNFOEC*, no. PDP5A.4, 2013

[KChris1] K. Christodoulopoulos et. al, "Dynamic Bandwidth Allocation in Flexible OFDM-based Networks," *Proc. of OFCNFOEC*, no. OTu15, 2011

[KChris2] K. Christodoulopoulos et. al, "Time-Varying Spectrum Allocation Policies and Blocking Analysis in Flexible Optical Networks," IEEE *Journal on Selected Areas in Communications*, vol. 31, no. 1, January 2013

[GShen] Gangxiang Shen et. al., "Maximizing Time-Dependent Spectrum Sharing between Neighboring Channels in CO_OFDM Optical Networks," *Proc. of ICTON*, no. Mo.B1.3, 2011

[MKlinkowski] M. Klinkowski et. al., "Elastic Spectrum Allocation for Time-Varying Traffic in FlexGrid Optical Networks," IEEE *Journal on Selected Areas in Communications*, vol. 31, no. 1, January 2013

[CXie] C. Xie et. al., "Spectrum Sharing for Time-varying Traffic in OpenFlow-based Flexi-Grid Optical Networks," *Proc. of ACP*, no. AF4A.52, 2012

[JZhang] J. Zhang et. al., "Time-dependent Spectrum Resource Sharing in Flexible Bandwidth Optical Networks," Journal of IET Networks, vol. 1, no. 4, December 2012

[NSambo] N. Sambo et. al, "Routing and Spectrum Assignment for Super-channel in Flex-grid Optical Networks," *Proc. of ECOC*, no. Mo.1.D.4, 2012

What is claimed is:

1. A method for provisioning time-varying traffic demands in an optical transport software-defined network, the method comprising:

pre-provisioning an amount of bandwidth for best effort traffic;

iteratively applying, using a processor, an iterative simulated annealing-based traffic provisioning procedure to determine candidate bandwidths for the best effort traffic in a set of iterations; and selecting a particular one of the candidate bandwidths for the best effort traffic that has a corresponding blocking value lower than a given blocking requirement $\beta$ and that requires a minimum amount of spectrum as compared to other ones of the candidate bandwidths for the best effort traffic, wherein said iteratively applying step includes:

varying the amount of bandwidth for best effort traffic in each of the iterations to determine the candidate bandwidths for the best effort traffic; and varying an amount of shared bandwidth between neighboring channels, out of the amount of bandwidth for best effort traffic, in each of the iterations, to further determine the candidate bandwidths for the best effort traffic.

2. The method of claim 1, wherein the candidate bandwidths for the best effort traffic are found responsive to a routing, wavelength assignment, and spectrum allocation procedure applied for the iterative simulated annealing-based traffic provisioning procedure.

3. The method of claim 2, wherein the routing, wavelength assignment, and spectrum allocation procedure comprises:

finding spectrum over the K-shortest routes; and selecting a given route from among the K-shortest routes on which is available the spectrum at a lowest wavelength with respect to other routes from among the K-shortest routes.

4. The method of claim 3, wherein the routing, wavelength assignment, and spectrum allocation procedure further comprises:

determining a spectrum profile of the given route; and searching in the spectrum profile for a spectral island at the lowest available wavelength and having at least a predetermined minimum number of at least one of available wavelength slots and shared wavelength slots.

5. The method of claim 4, wherein the spectrum profile is determined from among a predetermined possible set of spectrum profile states comprising occupied, provisioned, shared, and available.

6. The method of claim 1, wherein said step of varying the amount of bandwidth for best effort traffic comprises using different amounts of bandwidth for the best effort traffic to evaluate different amounts of spectrum supporting best effort traffic with different blocking probabilities.

7. The method of claim 1, wherein said step of varying an amount of shared bandwidth comprises using different amounts of shared bandwidth between neighboring channels to evaluate different amounts of spectrum supporting best effort traffic with different blocking probabilities.

8. The method of claim 1, wherein the amount of bandwidth for the best effort traffic and the amount of shared bandwidth are increased in each of the iterations.

9. The method of claim 1, wherein the iterative simulated annealing-based traffic provisioning procedure further comprises:

defining a current traffic demand configuration as a random order of a plurality of time-varying traffic demands; and defining a new traffic demand configuration as a descending order of the plurality of time-varying traffic demands to reduce a convergence time, the descending order being based on respective cost functions of the plurality of time-varying traffic demands.

10. The method of claim 9, wherein the new traffic demand configuration is defined by swapping an order of the two neighboring traffic demands selected at random from among the plurality of time-varying traffic demands.

11. The method of claim 9, wherein said iteratively applying step includes applying a routing, wavelength assignment, and spectrum allocation procedure to the plurality of time-varying traffic demands in the descending order.

12. The method of claim 9, further comprising replacing the current traffic demand configuration with the new traffic demand configuration, responsive to an amount of energy of the new traffic demand configuration being less than an amount of energy of the current traffic demand configuration.

13. The method of claim 9, wherein each of the plurality of time-varying traffic demands is defined as a respective product of a respective requested guaranteed bandwidth and a respective number of hops along a shortest route between a source node and a destination node in the network.

14. The method of claim 1, wherein said simulated annealing based traffic provisioning procedure is performed until the amount of bandwidth pre-provisioned for the best effort traffic is equal to a corresponding transponder capacity.

15. A computer program product comprising a non-transitory computer readable storage medium having computer readable program code embodied therein for performing a method for provisioning time-varying traffic demands in an optical transport software-defined network, the method comprising:
pre-provisioning an amount of bandwidth for best effort traffic;
iteratively applying, using a processor, an iterative simulated annealing-based traffic provisioning procedure to determine candidate bandwidths for the best effort traffic in a set of iterations; and
selecting a particular one of the candidate bandwidths for the best effort traffic that has a corresponding blocking value lower than a given blocking requirement $\beta$ and that requires a minimum amount of spectrum as compared to other ones of the candidate bandwidths for the best effort traffic,
wherein said iteratively applying step includes:
varying the amount of bandwidth for best effort traffic in each of the iterations to determine the candidate bandwidths for the best effort traffic; and
varying an amount of shared bandwidth between neighboring channels, out of the amount of bandwidth for best effort traffic, in each of the iterations, to further determine the candidate bandwidths for the best effort traffic.

16. The computer program product of claim 15, wherein the candidate bandwidths for the best effort traffic are found responsive to a routing, wavelength assignment, and spectrum allocation procedure applied for the iterative simulated annealing-based traffic provisioning procedure.

17. The computer program product of claim 16, wherein the routing, wavelength assignment, and spectrum allocation procedure comprises:
finding spectrum over the K-shortest routes; and
selecting a given route from among the K-shortest routes on which is available the spectrum at a lowest wavelength with respect to other routes from among the K-shortest routes.

18. The computer program product of claim 17, wherein the routing, wavelength assignment, and spectrum allocation procedure further comprises:
determining a spectrum profile of the given route; and
searching in the spectrum profile for a spectral island at the lowest available wavelength and having at least a predetermined minimum number of at least one of available wavelength slots and shared wavelength slots.

19. The computer program product of claim 18, wherein the spectrum profile is determined from among a predetermined possible set of spectrum profile states comprising occupied, provisioned, shared, and available.

20. The computer program product of claim 15, wherein the iterative simulated annealing-based traffic provisioning procedure further comprises:
defining a current traffic demand configuration as a random order of a plurality of time-varying traffic demands; and
defining a new traffic demand configuration as a descending order of the plurality of time-varying traffic demands to reduce a convergence time, the descending order being based on respective cost functions of the plurality of time-varying traffic demands.

* * * * *